United States Patent [19]

Bardsley

[11] 4,219,349
[45] Aug. 26, 1980

[54] NUTRIENT COMPOSITIONS, METHODS AND PROCESSES

[75] Inventor: Charles E. Bardsley, St. Louis, Mo.

[73] Assignee: Mallinckrodt, Inc., St. Louis, Mo.

[21] Appl. No.: 17,315

[22] Filed: Mar. 5, 1979

Related U.S. Application Data

[63] Continuation of Ser. No. 848,555, Nov. 4, 1977, abandoned.

[51] Int. Cl.² .......................... C05D 9/00; C05D 9/02
[52] U.S. Cl. ........................................... 71/62; 71/63; 71/64 F; 71/64 G; 71/DIG. 2
[58] Field of Search .................. 71/64 R, DIG. 2, 31, 71/64 F, 64 G, 64 D, 63, 62

[56] References Cited

U.S. PATENT DOCUMENTS

| | | | |
|---|---|---|---|
| 3,062,637 | 11/1962 | Marples et al. | 71/64 G |
| 3,357,814 | 12/1967 | Getsinger | 71/31 |
| 3,441,400 | 4/1969 | Otrhalek | 71/64 G |

FOREIGN PATENT DOCUMENTS

905024  11/1945  France ......................................... 71/31

*Primary Examiner*—S. Leon Bashore
*Assistant Examiner*—Chris Konkol
*Attorney, Agent, or Firm*—Roy J. Klostermann

[57] ABSTRACT

Plant nutrient compositions comprising various plant nutrients attached to calcined clay are provided as well as methods for their preparation and processes for their use.

8 Claims, No Drawings

NUTRIENT COMPOSITIONS, METHODS AND PROCESSES

This is a continuation of application Ser. No. 848,555, filed Nov. 4, 1977 now abandoned.

BACKGROUND OF THE INVENTION

The present invention relates to certain free flowing plant nutrient compositions containing calcined clay granules having various plant nutrients attached thereto, a method for their preparation and a process for their use.

During recent years there has been a rapid increase in the use of growing and potting media (hereinafter called "growth media") for plants containing little or no natural mineral soil. Growth media are generally mixtures of an organic material such as peat or tree bark with inorganic granular materials such as sand, perlite, or exfoliated mica. They have desirable air relations for commercial plant growing operations and are usually relatively free of insects and diseases compared to many natural soils. Additionally, they are easier to handle and ship due to lightness.

Since it is the soil minerals that supply the majority of minor nutrients, typically growth media are deficient or devoid of one or more of these nutrients. Minor plant nutrients, i.e., those elements used in amounts ranging from several hundred parts per million to trace quantities, are commonly referred to as micronutrients. Micronutrients are iron, zinc, manganese, copper, boron, molybdenum and chlorine.

One of the current ways of supplying micronutrients to growth media is to apply a shot gun mixture of these micronutrients in salt form. However, because these mixtures are of different particle sizes and densities, they tend to segregate, and thus, are not uniformly distributed in the growth media. Another method of supplying certain of these micronutrients is to apply them as their metal chelates. These chelates are in ready available form for plant uptake or foliar absorption. In general, they are used to cure an acute problem and are not effective for long term problems because leaching readily removes those chelates from the media. Thus, they must be applied repeatedly, making them expensive. Additionally, ionic micronutrients can not be supplied as chelates. Another alternative is to employ virtually insoluble microfrits which are widely accepted as slowly available sources of micronutrients. However, the rate of release of these nutrients is variable, non-predictable, and may be inadequate. Also, the density and fineness of these frits makes uniform incorporation into growth media difficult.

Plant nutrient compositions suitable for providing plant micronutrients to growth media should possess certain characteristics which include (1) essentially uniform chemical and physical properties; (2) ability to be easily incorporated into the growth media; (3) suitable means for micronutrient retention and release; (4) favorable density and particle size so that they are compatible with the growth media, and (5) a low risk of causing micronutrient imbalances, for example, too much manganese causes iron deficiency.

An object of this invention is to provide plant nutrient compositions containing micronutrients which have essentially uniform chemical and physical properties, have a suitable means for micronutrient retention and release, have a low risk of providing micronutrient imbalances, are compatible with growth media and can be easily incorporated into such media.

Another object of this invention is to provide slow release plant nutrient compositions.

Another object of this invention is to provide plant nutrient compositions containing micronutrients and the macronutrient sulphur.

The plant nutrient compositions of this invention include calcined clay granules as carriers having attached thereto micronutrients and the macronutrient sulphur. The importance of sulphur is that it is used by plants in amounts comparable to phosphorous and should be present in amounts to provide a nitrogen: sulphur ratio of about 12:1 in order to metabolize protein. Most high analysis fertilizers are nearly devoid of sulphur.

Calcined clay granules are utilized in the practice of this invention. It is to be understood herein that the term calcined clay means that it has been heated at elevated temperatures to effect bonding among individual particles. In general the clay should be calcined at a sufficiently high temperature i.e., 500° C. to 750° C. to insure dimensional stability wet or dry and should be capable of absorbing about 30 to 45% by weight of aqueous liquid and still maintain flowability of individual granules.

It is desirable that such granules be largely composed of what is called three platelet or 2:1 layer silicate minerals. The most widely distributed 2:1 clay is montmorillinite which is an essential component of what is called bentonite. Similar clays are attapulgite, sepiolite, chlorite and vermiculite. All of these clays to some degree have a permanent negative charge by isomorphous substitution of a lower valence cation for aluminum in the middle (octahedral) layer or aluminum for silicon in the outer (tetrahedral) layer. The result of these quirks of nature is structural negativity not influenced by pH. For example, selected calcined clays have a permanent cation exchange capacity in the range of 15–25 milliequivalents per 100 grams.

To be compatible with and allow even distribution throughout the commonly used growth media, which generally have a density of from about 0.3 to about 0.8 gm. per cc and a particle size of from about 0.1 to 10 mm, the clay granules generally have a bulk density from about 0.4 to 0.8 grams per cc with a particle size from about 4 to about 50 mesh (U.S. standard sieve).

The following micronutrients are attached to the calcined clay granules: iron, zinc, manganese, copper, molybdenum, boron and chlorine. The macronutrient sulphur is also attached. The micronutrients and macronutrient are present in a form suitable to nourish plants. Thus, they may be present in ionic form or combined as molecules, e.g., $Fe^{+2}$, $Fe^{+3}$, $Zn^{+2}$, $Mn^{+2}$, $Cu^{+2}$, $H_2BO_3^{-1}$, $HBO_3^{-2}$, $BO_3^{-3}$, $MoO_4^{-2}$, $Cl^{-1}$, $SO_4^{-2}$, $FeSO_4$, $ZnSO_4$, $FeCl_2$ and $ZnCl_2$.

The plant nutrient compositions of this invention exhibit plant nutrient composition characteristics which include having essentially uniform physical and chemical properties, having a suitable means for nutrient retention and release, having a low risk of providing nutrient imbalances, being free flowing, having reduced dustiness, being compatible with growth media and being easily incorporated into growth media.

The micronutrients and the macronutrient sulphur are present in the plant nutrient compositions of this invention in plant nutrient amounts, i.e., when such compositions are used in plant nourishing amounts, sufficient micronutrients and the macronutrient are present to nourish plant growth. Nutrient amounts include, for example, in the case of iron an amount of from about 0.1 to about 5.0 weight percent, in the case of manganese an amount from about 0.05 to about 1.0 weight percent, in the case of zinc an amount from about 0.02 to about 2.0 weight percent, in the case of copper an amount from about 0.05 to about 0.5 weight percent, in the case of sulphur an amount from about 1.0 to about 5.0 weight percent, in the case of boron an amount from about 0.02 to about 0.03 weight percent, in the case of molybdenum an amount from about 0.0005 to about 0.0010 weight percent and in the case of chlorine an amount from about 0.1 to about 3.0 weight percent. All values are on an elemental basis, based on the total weight of the plant nutrient composition.

When the compositions of this invention contain cations they are attached to the negatively charged exchange sites until the charges are satisfied. Excess cations anions and combined molecules, if present, are absorbed by physical forces and held on the internal and external surfaces of the granules. Usually, the ferrous ion, if present, oxidizes in part to ferric ion and this ion forms a coating on the granule which it is believed acts as a barrier to the free egress of the absorbed ions.

To insure ease of incorporation and a more uniform dispersion throughout the growth media, the bulk density of the compositions of this invention is generally in the range from about 0.5 to about 1.2, preferably from about 0.8 to about 1.0 grams per cc and the particle size of the composition is in the range from about 4 to about 50 mesh U.S. standard sieve.

The compositions of the present invention are prepared by a method which comprises mixing with the calcined clay granules under ambient conditions a solution or suspension containing the micronutrients and the macronutrient, sulphur. Advantageously, the solutions in highly concentrated form are sprayed on tumbling granules. Usually, the micronutrients and sulphur in their water soluble salt form are dissolved in water to form the solution or suspension to be applied to the clay granules. Often, because of incompatibilities, (e.g., salting out, reaction precipitation) more than one solution or suspension is employed. In an especially preferred embodiment, a first solution containing ferrous chloride, boric acid, ammonium molybdate or other suitable soluble, iron, boron, molybdenum or chloride salts is applied by spraying to the calcined clay granules. The concentration is from about 25% to about 35% on a dissolved solids basis. Next a second solution containing manganese sulfate, zinc sulfate and copper sulfate or other suitable manganesium, zinc, copper or sulphur salts is applied by spraying to the calcined clay granules. By applying the micronutrients in this manner, interaction between iron and copper and salting out is prevented.

Advantageously, a sequestering agent is contained in the solutions. Such sequestering agents include citric acid, tartaric acid, ethylene diamine tetra acetic acid, ethylene diamine di(o-hydroxy phenyl acetic acid), etc. in sequestering amounts, usually from about 0.1% to about 5% by weight based on the total weight of the product composition of this invention. When present in the plant nutrient compositions of this invention, the sequestering agents tend to accelerate the release of iron and other metallic ions.

The process of using the plant nutrient compositions of this invention comprises applying the compositions to the growth media in plant nourishing amounts, i.e., an amount sufficient to nourish plant growth. Typically such a plant nourishing amount is in the range of about 1 to 20 lb. per cubic yard of medium. The compositions are conveniently applied by mixing the correct quantity with the media.

It is believed that when the plant nutrient compositions of this invention are incorporated into the growth media they will equilibrate with the solution bathing the roots and the media. The plant roots exchange protons and bicarbonates for the needed ions in solution which in turn exchange with the micronutrients on the clay granules to supply nutrients to complete the cycle. This is nature's method of sustaining the vegetation of the planet and will work equally well for any plant growth in a growth media.

The invention is further illustrated by the following illustrative examples which are not in limitation of the invention. All parts and percentages are by weight unless otherwise indicated.

EXAMPLE I 1000 g. of 16 to 30 mesh calcined meta-betonite clay granules were sprayed, while tumbling, as follows:
1. With a first solution composed of 109 g. $FeCl_2.4H_2O$, 1.71 g. $H_3BO_3$, and 0.02 g. $(NH_4)_5Mo_7O_{24}.H_2O$ made to a total volume of 200 ml with deionized water.
2. With a second solution composed of 23 g. $MnSO_4.H_2O$, 67 g. $ZnSO_4.7H_2O$, and 19 g. $CuSO_4.5H_2O$ made to a total volume of 200 ml with deionized water.

The resulting product weighed 1524 g. and flowed freely. It was extracted in 1:1 HCl and the elements converted to soluble form and analyzed by official methods of the Association of Agricultural Chemists. Chlorine was extracted in nitric acid and determined separately also by official methods.

The product was found to contain the following micronutrients. Percents are by weight on an elemental basis
Fe—2.61%
Zn—1.00%
Mn—0.52%
Cu—0.33%
B—0.02%
Mo—0.0005%
Cl—2.64%
The clay granules contributed 0.69% Fe.

EXAMPLE II 656 lb. of 16 to 30 mesh calcined attapulgite clay granules were sprayed while tumbling, as follows:
First, with a solution composed of 117 lb. ferrous chloride solution (17.5% Fe), 1.20 lb. boric acid (17.5% B), 6 g. ammonium molybdate (54% Mo), and 53.5 lb. water.
Second, with a solution composed of 29 lb. zinc sulfate (36% Zn), 18.3 lb. manganese sulfate (27.3% Mn), 11.8 lb. copper sulfate (25.4% Cu), and 113.2 lb. water.

The resulting product weighed 1000 lb. and flowed freely.

Upon analysis by official methods the product was found to be:
Fe—2.90%
Zn—1.04%
Mn—0.50%

Cu—0.29%
B—0.02%
Mo—0.0007%
S—0.96%
Cl—2.58%

The clay granules contributed 0.90% Fe.

ASSESSMENT OF NUTRIENT AVAILABILITY

Extractions 10 g. of the composition of this invention made according to Example II were shaken 30 seconds in 250 ml 1 N ammonium acetate at pH 3.0. After filtering, the extract was dried on a steam bath and redissolved in 1:1 HCl for analysis by official methods.

Results showed the following availability of nutrients:
Fe—1%
Zn—73%
Mn—82%
Cu—47%
B—90%
Mo—33%

Cl and S were not determined.

Similarly, another 10 gram sample was extracted according to official procedures using water and $Na_2EDTA$. Results indicated that 100% of Cl, Mo, B and 80% of the S were recovered in the water and are available. 60% of the added Fe, 100% of the Zn, 98% of the Mn, and 70% of the Cu were recovered in the EDTA extract and are available.

Leaching From Potting Mix

The composition of Example II incorporated in a 1:1 peat-perlite at 5 lb. per cubic yard of mix was equilibrated at field capacity for 24 hours, then leached with ½-inch increments of water daily for 5 days. The extract was composited and showed:

| Nutrient | % leached from mix |
|---|---|
| Fe | 0% |
| Zn | 16% |
| Mn | 27% |
| Cu | 2% |
| B | 64% |
| Mo | 98% |

Plants

Marigolds were grown for 3 months in an untreated peat-lite mix and a mix treated with 2.5 lb. of the composition of this invention per cubic yard. Analysis of the plants indicated the following concentrations of elements:

| | Concentration in ppm (means of 4 replicates) | | | | |
|---|---|---|---|---|---|
| | Fe | Zn | Mn | Cu | B |
| Treated | 158 | 137 | 170 | 22 | 39 |
| Untreated | 150 | 76 | 100 | 12 | 22 |

Six genera of foliage plants (Palm, Aralia, Aphelandra, Spathiphyllum, Peperomia, and Calathea) were grown in an untreated 1:1 peat-pine bark medium for 15 weeks in a treated one using the composition of this invention at a rate of 5.0 lb. per cubic yard. Each treatment was replicated six times on each plant and the mean values over all plants is as follows:

| | Concentration in ppm (means of 36 plants) | | | | |
|---|---|---|---|---|---|
| | Fe | Zn | Mn | Cu | B |
| Treated | 60 | 95 | 176 | 10 | 47 |
| Untreated | 55 | 51 | 90 | 5 | 34 |

What is claimed:

1. A granular, free-flowing plant nutrient composition suitable for use in growth media exhibiting plant nutrient composition characteristics including having essentially uniform chemical and physical properties, a bulk density of from about 0.8 to about 1.0 gram per cc and a particle size of from about 4 to about 50 mesh consisting essentially of calcined clay granules selected from the group consisting of montmorillonite, attapulgite, sepiolite, and chlorite having a permanent cation exchange capacity of from about 15 to 25 milliequivalents per 100 grams and having attached thereto in nutrient amounts the nutrients iron, zinc, molybdenum, manganese, copper, boron, chlorine and sulphur.

2. A composition according to claim 1 wherein said clay is attapulgite.

3. A composition according to claim 2 wherein said clay is montmorillonite.

4. A process for preparing the composition of claim 1 which comprises applying to the calcined clay granules a first solution containing soluble salts to provide the nutrients iron, boron, molybdenum and chlorine and thereafter applying to said granules a second solution containing soluble salts to provide the nutrients manganese, sulphur, zinc and copper.

5. A process according to claim 4 wherein the salts in the first solution are $FeCl_2$, $H_3BO_3$ and $(NH_4)_6Mo_7O_{24}$ and in the second solution are $MnSO_4$, $ZnSO_4$, and $CuSO_4$.

6. A process according to claim 5 wherein the first solution additionally contains in a sequestering amount a sequestering agent selected from the group consisting of citric acid, tartaric acid, ethylene diamine tetraacetic acid, and ethylene diamine di(o-hydroxyphenyl acetic acid).

7. A process for treating growth media to provide plant nutrients which comprises applying to said media in plant nourishing amounts the composition of claim 1.

8. A granular, free-flowing plant nutrient composition suitable for use in growth media exhibiting plant nutrient composition characteristics including having essentially uniform chemical and physical properties, the nutrients being slowly releasable, having a bulk density of from about 0.8 to about 1.0 gm/cc and a particle size of from about 4 to about 50 mesh U.S. standard sieve consisting essentially of granules of calcined montmorillonite clay having a cation exchange capacity of from about 15 to 25 milliequivalents per 100 grams having attached thereto about 1% by weight of sulphur, about 0.02% by weight of boron, about 2.60% by weight of chlorine, about 0.3% by weight of copper, about 0.50% by weight of manganese, about 0.0006% by weight of molybdenum, about 1.0% by weight of zinc and about 2.0% by weight of iron.

* * * * *